(12) United States Patent
Philipps

(10) Patent No.: US 6,208,409 B1
(45) Date of Patent: Mar. 27, 2001

(54) FILM DECK

(75) Inventor: Bernd Philipps, Untergruppenbach (DE)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/398,906

(22) Filed: Sep. 3, 1999

(30) Foreign Application Priority Data

Sep. 9, 1998 (DE) .............................. 198 41 071

(51) Int. Cl.⁷ .................................................. G03B 27/62
(52) U.S. Cl. .............................................................. 355/75
(58) Field of Search ................................ 355/40, 41, 72, 355/75, 76; 352/221, 223, 233

(56) References Cited

U.S. PATENT DOCUMENTS 5,673,104 * 9/1997 Rottner ................................... 355/75
5,767,943 * 6/1998 Oberhardt et al. ..................... 355/75

FOREIGN PATENT DOCUMENTS 0 770 917 A1   5/1997  (EP) ............................... G03D/13/00

* cited by examiner

Primary Examiner—D. Rutledge
(74) Attorney, Agent, or Firm—Peyton C. Watkins

(57) ABSTRACT

The invention relates to a film deck (100) for feeding and returning developed photographic films of various types from an insertion station (3, 12) to a processing station (BA) of a mini-lab (ML); with the film deck being intended in particular for APS films and 35 mm films. A rapid and reliable adjustment of the film deck to the various film types to be processed is achieved by providing a first carrier plate (10) with means for film insertion (3, 12) film guidance (2), film transport (4) and film-specific processing (5, 6, 7) of the various film types, and a second carrier plate (20) with means (22, 23, 24, 25) for active film drive of the various film types for transporting them from the insertion device (10) to the processing station (BA), and means (11, 22) for connecting and detaching the first carrier plate (10) to/from the second carrier plate (20).

5 Claims, 7 Drawing Sheets

FILM DECK

FIELD OF THE INVENTION

The present invention relates to mini-labs for film processing and, more specifically, to a film deck for feeding and returning developed photographic films of various types from an insertion station to a processing station of a mini-lab.

BACKGROUND OF THE INVENTION

There are numerous prior art disclosures that pertain to insertion devices for film decks and mini-labs. Among these prior art devices is European patent application 0 770 917 A1, which shows a device for the processing of photographic films within a film insertion station that is designed such that both an APS (Advanced Photo System) film and a 35 mm film can be processed. To that end, European patent application 0 770 917 A1 illustrates film edge guides designed as setting means, which are adjustable to the respective film width by two actuating rods connected to a motor. To prevent incorrect insertions, extensive scanning means are needed to set the film transport and setting means to the film type inserted, such as APS film or 35 mm film. Furthermore, it is necessary to use so-called copy plates for setting a copier (mini-lab) to the film size currently being processed and for which the device is used. This makes the overall design of the device complicated and also prone to wear and faults because of the incorporation of setting and scanning means.

From the foregoing discussion, it should be readily apparent that there remains a need in the art for a design that educes the resulting complexity of the resulting device.

SUMMARY OF THE INVENTION

The object underlying the present invention is therefore to provide a film deck for feeding and returning developed films of various type, in particular for APS films and 35 mm films, from an insertion station to a processing station of a mini-lab, and that avoids the above drawbacks of the prior art. In particular, a simple design that dispenses with moving setting and scanning means is to ensure rapid and reliable adjustment of the film deck to the various film types to be processed.

This object is attained by a film deck having the features of claim 1. By a complete exchange only of the first film deck carrier plate having film-specific processing and transport means, it is advantageously achieved that rapid and reliable feeding of films of various sizes is possible, in particular of APS films and 35 mm films, to a processing station of a mini-lab. Hence a simple adjustment of the film feed to the copying station of the mini-lab is achieved. Since the film deck in accordance with the invention is matched only to a certain film size in each case, an incorrect insertion of films, for example due to a mix-up, is ruled out even for incompletely trained employees of the mini-lab. In addition, wear and tear on the equipment is markedly minimized as a result of dispensing with setting means that set the device to the film type that is to be processed. A simplified design is also achieved by the stationary connection to the mini-lab of a second carrier plate having all the means for actively driving the film. With this version of the film deck, it is not necessary to close down the entire mini-lab in the event of a failure of the film-specific means arranged on the carrier plate.

The invention, and its objects and advantages, will become more apparent in the detailed description of the preferred embodiments presented below.

DETAILED DESCRIPTION OF THE INVENTION

Figure 1:
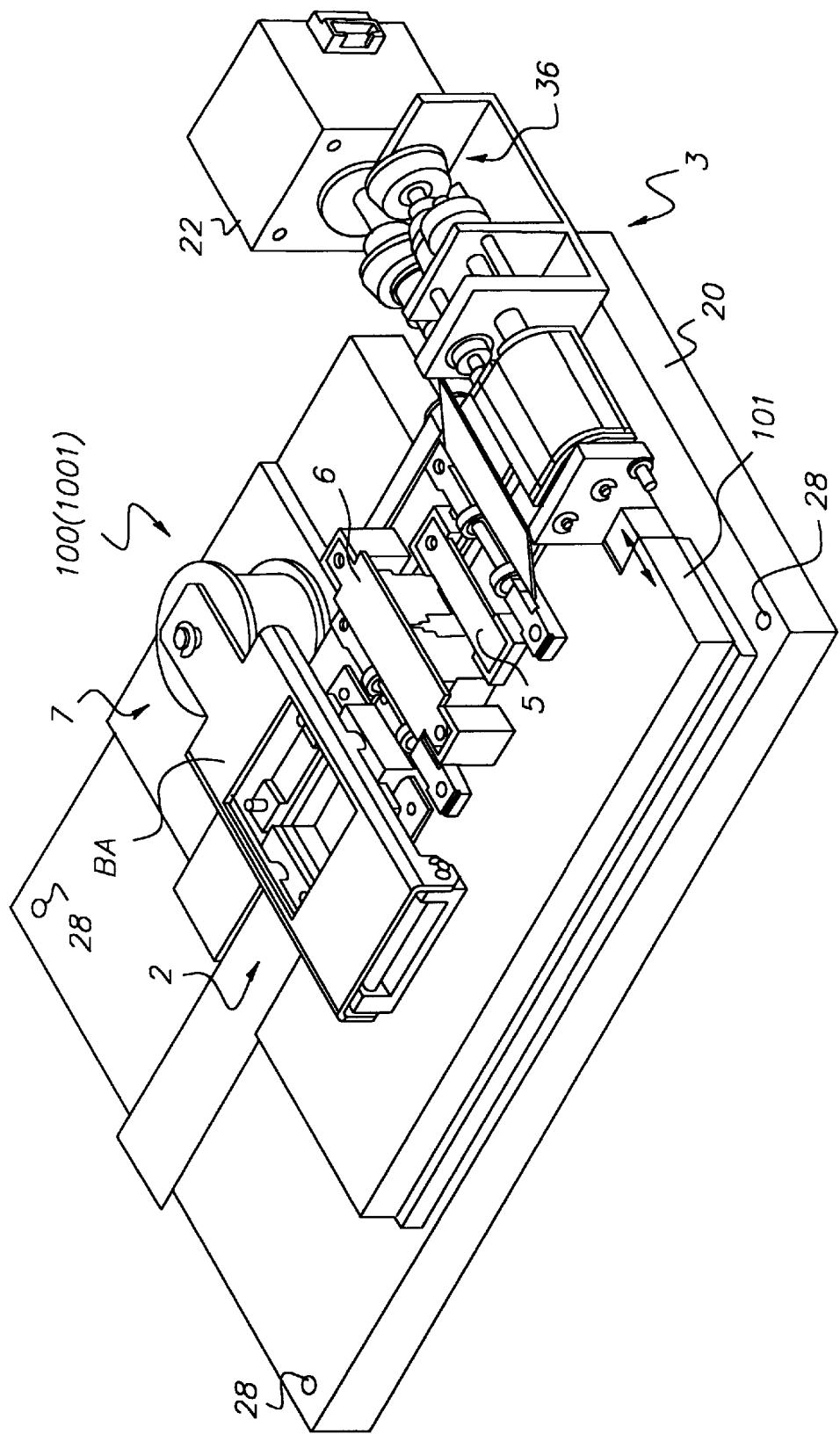
FIG. 1 shows a perspective view of the film deck in accordance with the invention for APS films.

Referring to FIG. 1 which shows a perspective view of the film deck in accordance with the invention for APS films, the film deck 100, identified as 1001 for APS films (1002 for 35 mm films) is formed from a first carrier plate, 101 for the case of APS films (first carrier plate 102 for the case of 35 mm films) and from a second carrier plate 20. The first carrier plate 101 for APS films has means for the film insertion 3 from where the film cs conveyed into a guide 2 of the carrier plate matched to the film width until the film is further conveyed to underneath a PCB sensor 5 for scanning of the DX code and perforation of a film. Arresting device 7 secures the film and an MOF (magnetic of film) unit 6 is provided for scanning the magnetic tracks contained on APS film.

The second carrier plate 20 is connected to the mini-lab by connecting means 28 in a stationary manner, not shown, so that feeding of the developed photographic film to the processing station BA (copying window) is enabled.

Figure 2:
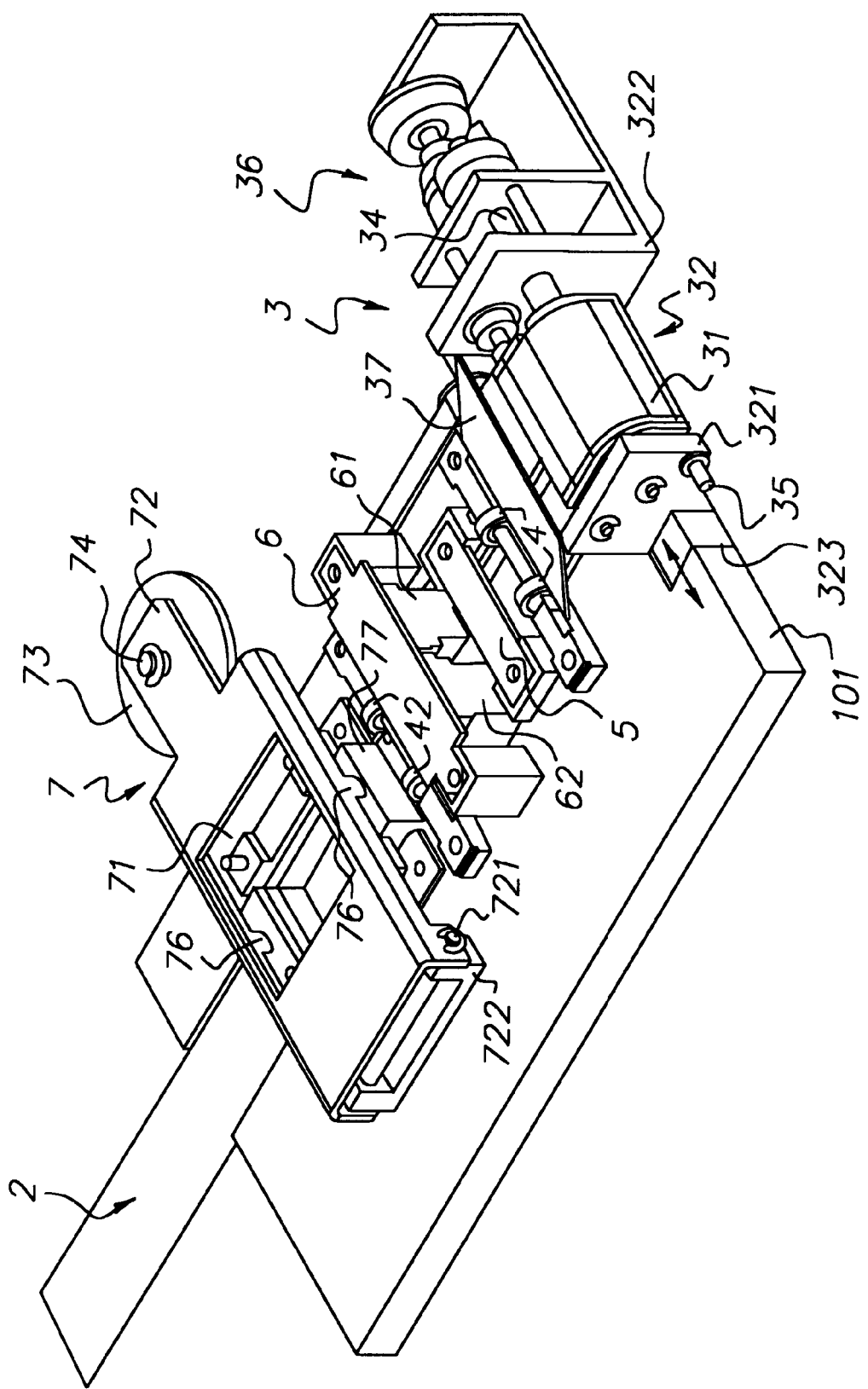
FIG. 2 shows a view of a first carrier plate of the film deck for APS films in accordance with FIG. 1 from above.

Referring now to FIG. 2, which shows a view of a first carrier plate of the film deck for APS films in accordance with FIG. 1 from above, the first carrier plate 101 for APS films has means for the film insertion 3 that substantially comprise a film cartridge receptacle 32. The film cartridge receptacle 32 comprises a stationary film cartridge holder with drive and transmission block 321 and a movable film cartridge holder 322 that is movable by a sliding part 323 in the direction of the arrow as shown in FIG. 2. The holder 322 has a support pin for supporting the film spool (not identified), a pushbutton 35 for status inquiry of whether the film cartridge contains an already developed film or an undeveloped one, and a support pin that engages in the hollow shaft of the film cartridge shutter. By means of a stepping motor 22 that drives, via a transmission block 36, a shaft 33 for opening and closing the film cartridge shutter and a shaft 34 for driving the film spool, the film 1 (not shown) can be wound forward out of the film cartridge 31 or back. The film is passed over a film guide 37 designed as a guide plate into a guide 2 of the carrier plate matched to the film width until a first passively driven film drive roller pair 41 grips the film, conveys it further to underneath a PCB sensor 5 for scanning of the DX code and perforation, and to underneath an MOF (magnetic of film) unit 6 for scanning the film magnetic tracks, until a second passively driven film transport roller pair 42 grips the film in order to convey it further to underneath a projection opening 71 of a film arresting device 7. Individual sensors 61 and 66 are provided for scanning the magnetic tracks of the film form a part of the PCB sensor unit 5. The film arresting device 7 serves mainly for holding the film flat so that a correct copying operation can be performed. To do so, an arresting plate 72 is provided that is connected to a holder 722 via a hinge 721. For holding the film flat in the projection opening 71, the arresting plate 72 is pressed together with the film against a film support surface 77 with its projection opening 8 by means of an anchor plate 73 that is actuatable by applying current to the solenoid 75 (not shown) via an anchor pin 74 engaging in the solenoid 75. The elastic hold-downs 76 also serve to assist a flat film position. The solenoid 75 as an active element is here not arranged on the first carrier plate 101, as is made clear by FIGS. 2 and 3.

Figure 3:
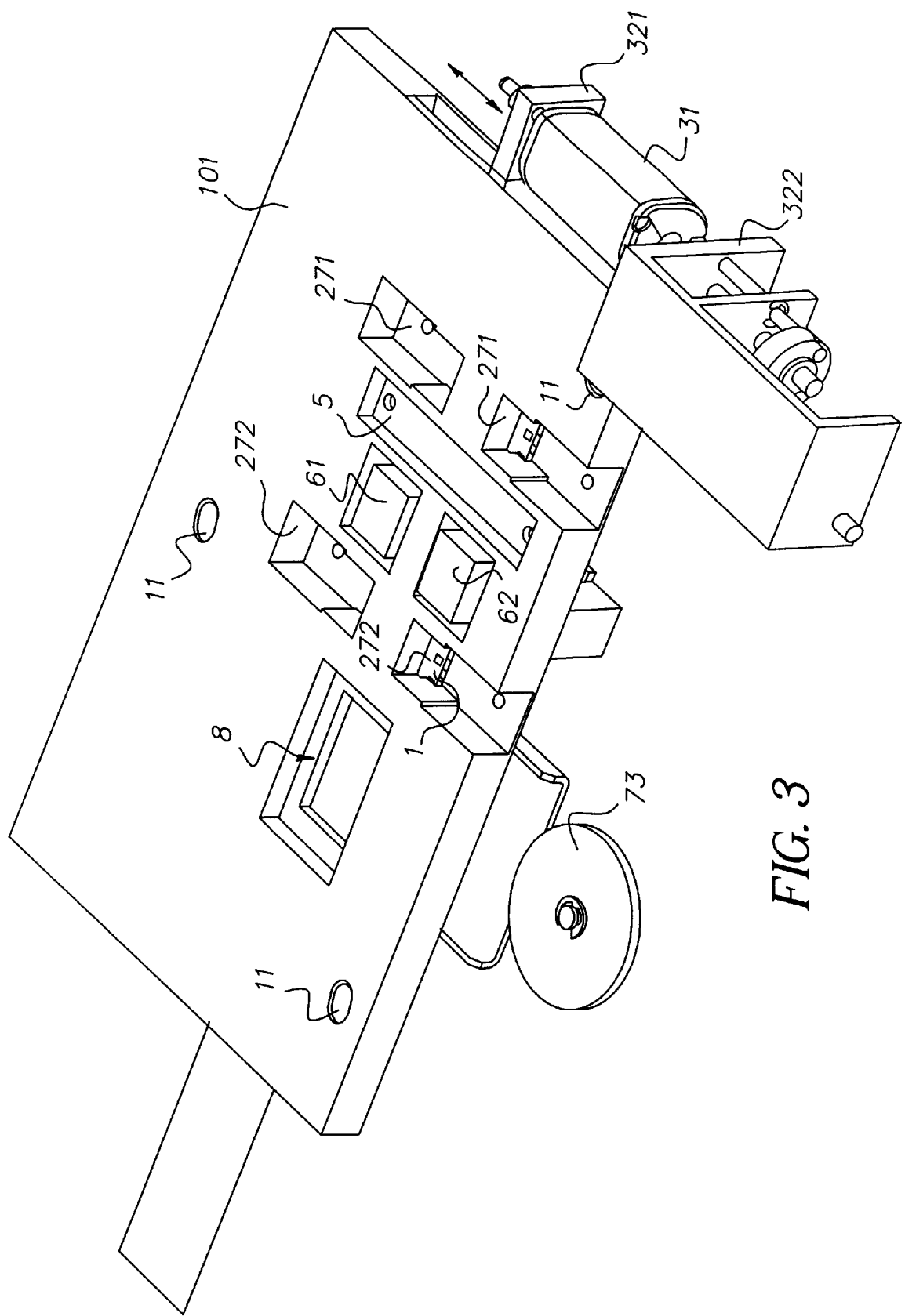
FIG. 3 shows a view of the first carrier plate according to FIG. 2 from below.

FIG. 3, which shows a view of the first carrier plate 101 according to FIG. 2 as seen from below, shows openings 271 and 272, within which actively driven film transport roller pairs 251 and 252 (FIG. 7) are pressed by their spring-loaded bearings against the film 1 and passively driven film by transport roller pairs 41 and 42. Likewise, the individual sensors 61 and 66 for scanning of the film magnetic tracks are shown which form a part of the PCB sensor unit 5 which also comprises IR transmitter/receiver diodes. As a result, all film-specific means for film insertion, film guidance, film transport and film processing are arranged on the first carrier plate 101. The carrier plate 101 further shows three holes 11 arranged at intervals of 120° and into which engage fixing pins 21 of the second carrier plate 20. Film cartridge 31 and transmission block 321 and a movable film cartridge holder 322 are also illustrated from the view seen in FIG. 3 as well as the rear side of anchor plate 73.

Figure 4:
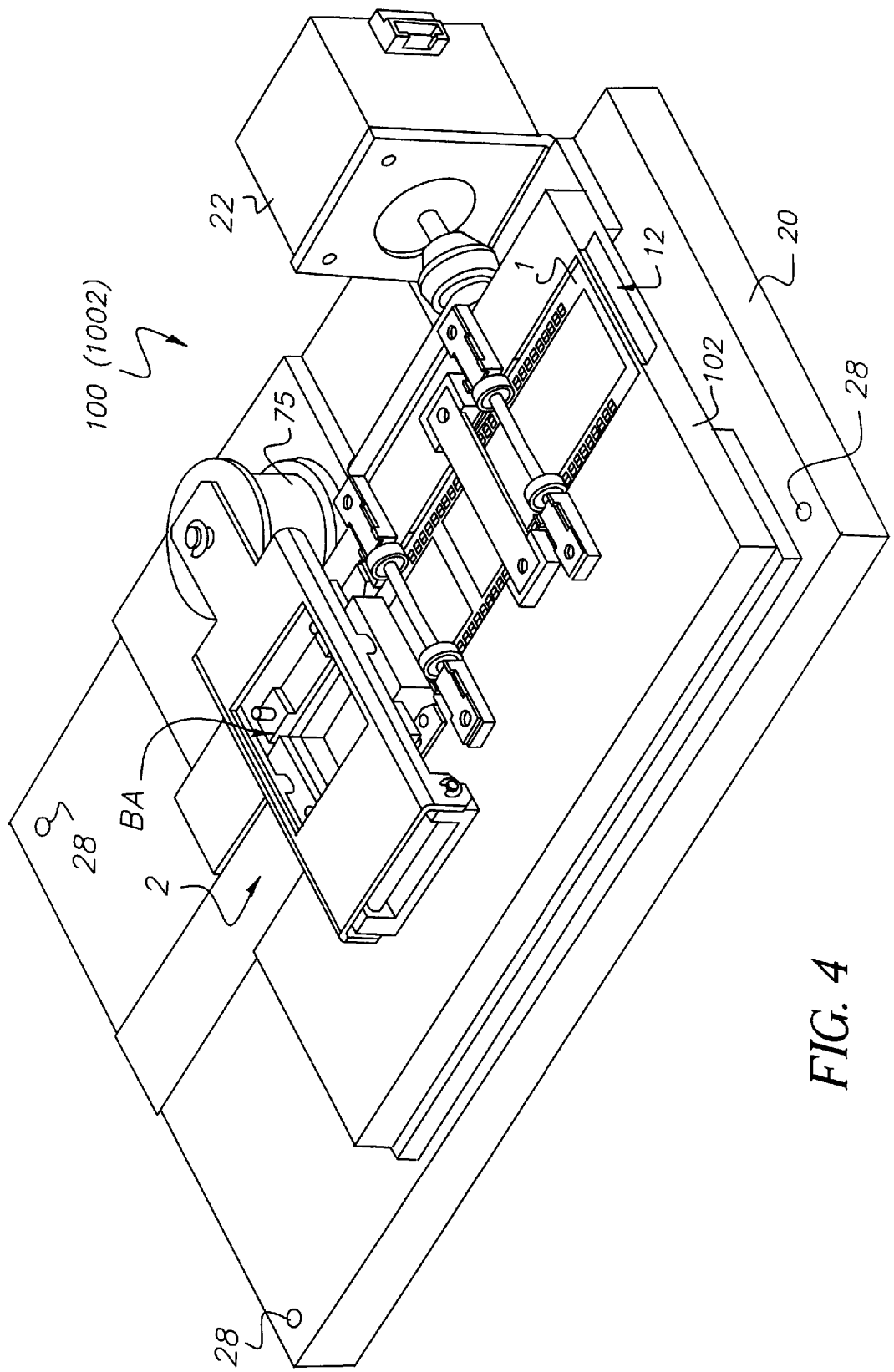
FIG. 4 shows a perspective view of the film deck in accordance with the invention for 35 mm films.

Referring now to FIG. 4, which shows a perspective view of the film deck in accordance with the invention for 35 mm films, the first carrier plate 102 for a 35 mm film has specific means for insertion, film guidance, film transport and processing of these films. Unlike carrier plate 101, only the film guide 2 of the carrier plate 102 is functionally set to the film width of 35 mm that is to be processed. The MOF unit is also dispensed with, since this film type is without magnetic tracks. The mode of operation of the film arresting device is similar to that with carrier plate 101. A film is inserted via the insertion opening 12 for this film type either directly from the film outlet of a film developing machine (not shown) or separately by hand.

Figure 5:
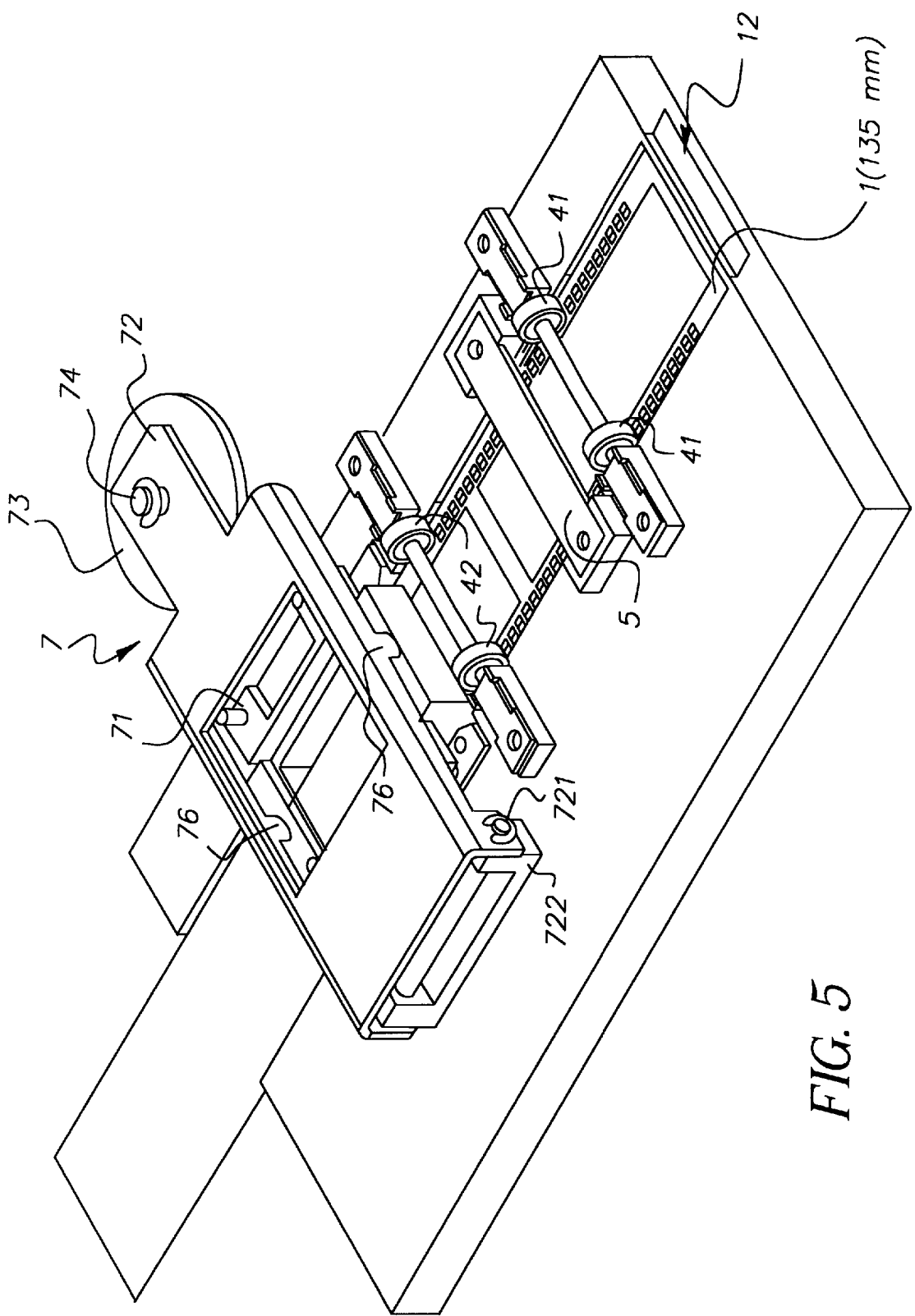
FIG. 5 shows a view of the first carrier plate of the film deck for 35 mm films in accordance with FIG. 4 from above.

FIG. 5 shows a view of the first carrier plate of the film deck for 35 mm films in accordance with FIG. 4. The film is passed over a first passively driven film drive roller pair 41 grips the film 1, conveys it further to underneath a PCB sensor 5 for scanning of the DX code and perforation until a second passively driven film transport roller pair 42 grips the film in order to convey it further to underneath a projection opening 71 of a film arresting device 7. The device 7 serves mainly for holding the film flat so that a correct copying operation can be performed. To do so, an arresting plate 72 is provided that is connected to a holder 722 via a hinge 721. For holding the film flat in the projection opening 71, the arresting plate 72 is pressed together with the film against a film support surface 77 with its projection opening 8 by means of an anchor plate 73 that is actuatable by applying current to the solenoid 75 (not shown) via an anchor pin 74 engaging in the solenoid 75. The elastic hold-downs 76 also serve to assist a flat film position. The solenoid 75 as an active element is here not arranged on the first carrier plate 102.

Figure 6:
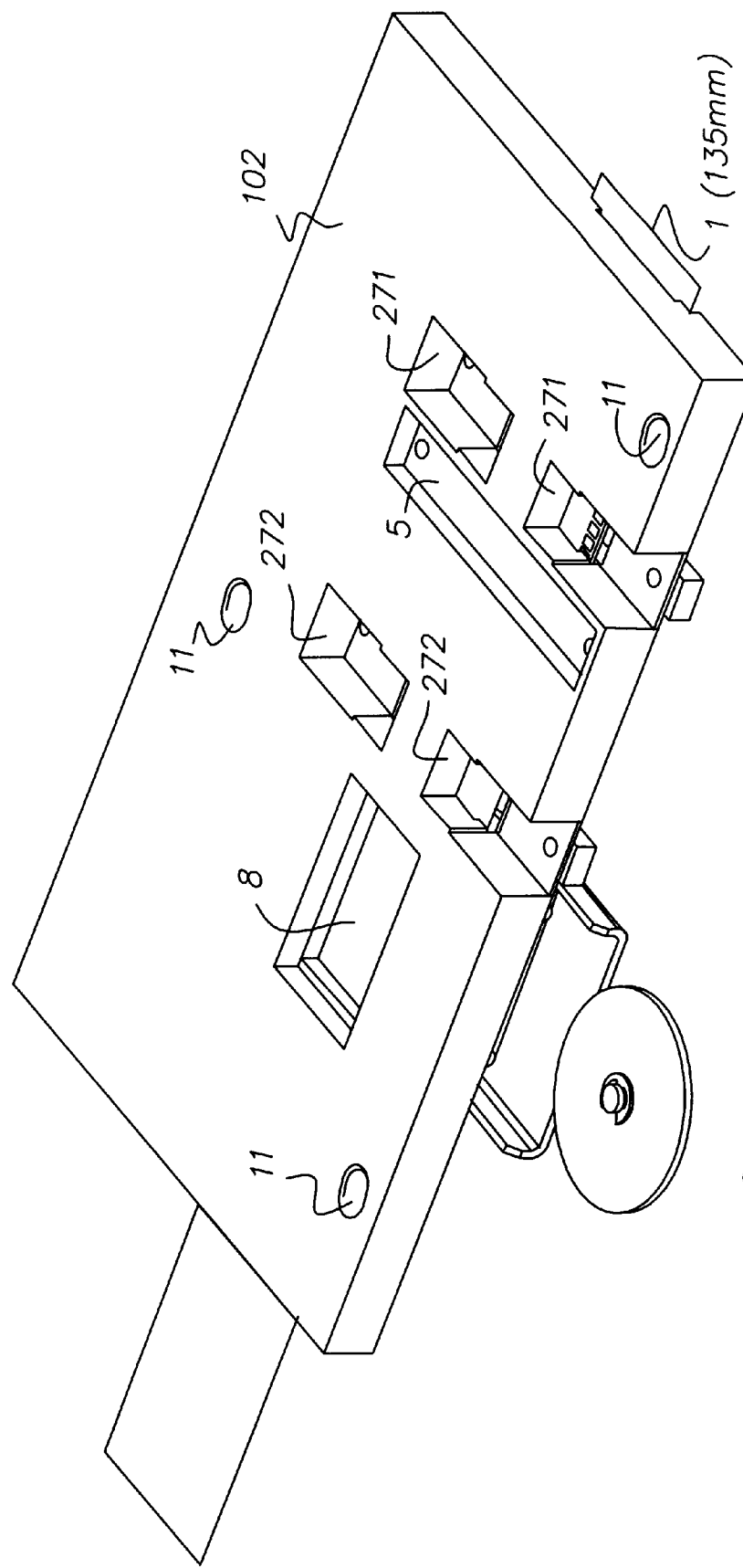
FIG. 6 shows a view of the first carrier plate in accordance with FIG. 5 from below.

FIG. 6 shows a view of the first carrier plate in accordance with FIG. 5 from below, which shows openings 271 and 272, which engage actively driven film transport roller pairs 251 and 252 (FIG. 7) that are pressed by their spring-loaded bearings against the film 1 and the passively driven film transport roller pairs 41 and 42, and the PCB sensor unit 5 comprising IR transmitter/receiver diodes. As a result, all film-specific means for film insertion, film guidance, film transport and film processing are arranged on the first carrier plate 101. The carrier plate 101 further shows three holes 11 arranged at intervals of 120° and into which engage fixing pins 21 of the second carrier plate 20.

In respect of the holes 11 of the carrier plates 101 and 102, the film guides 2, the film drive rollers 41, 42, the PCB sensor unit and the film arresting device 7 are arranged identically on both carrier plates.

Figure 7:
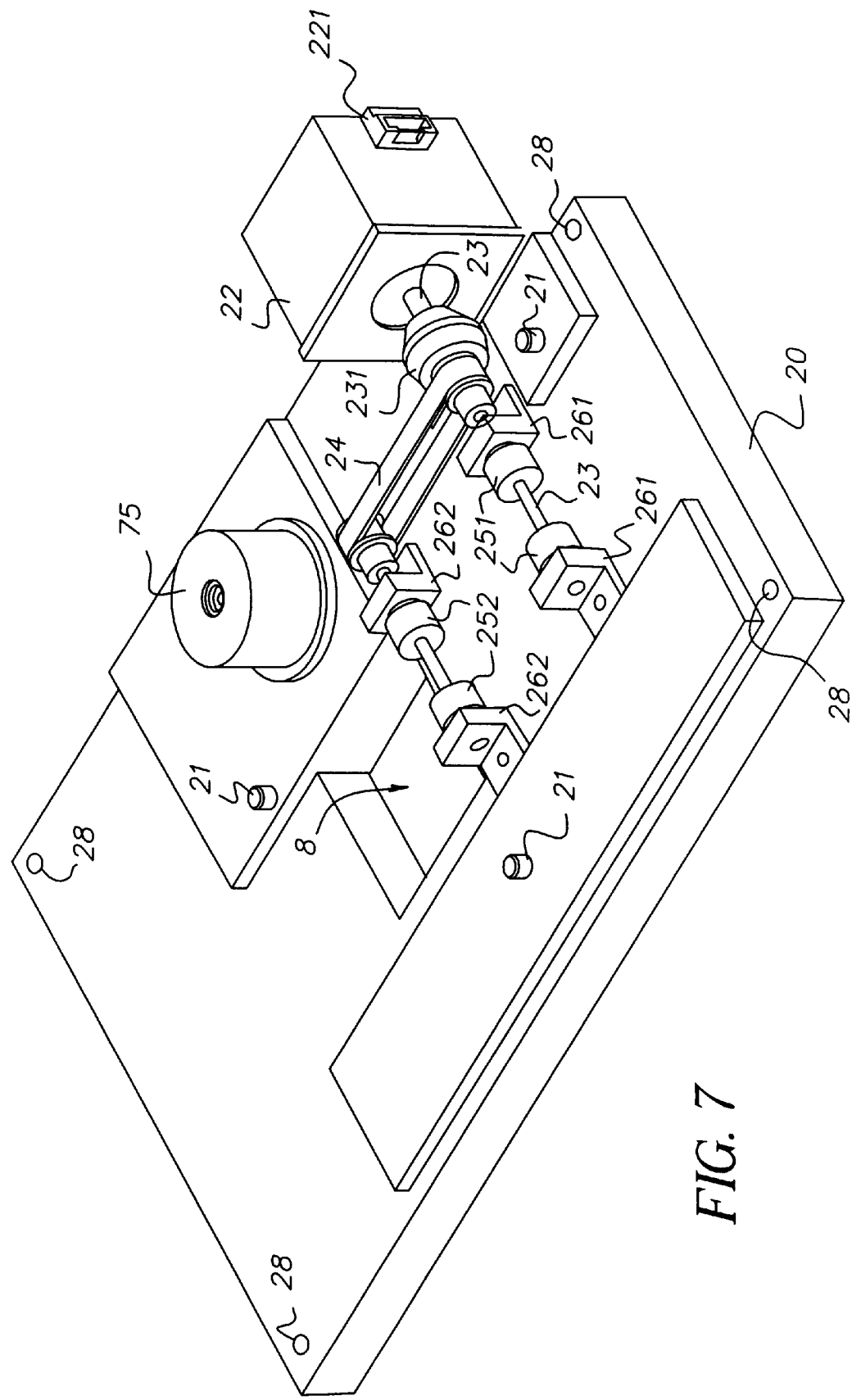
FIG. 7 shows a perspective view of a second carrier plate of the film deck.

FIG. 7 shows a perspective view of a second carrier plate 20 of the film deck, wherein, an arrangement similar to the first carrier plates 101 and 102, the second carrier plate 20 has three fixing pins 21 at intervals of 120°, so that here too a precisely fitting connection between the carrier plates can be made. The weight of the first carrier plate, which is made of steel, is sufficient for a secure connection. By simply changing the carrier plates 10 therefore, a rapid changeover of the film deck to another film type can be achieved.

The second carrier plate 20 of the film deck 100 has all the means for active film drive, such as a stepping motor 22 that drives a first film transport roller pair 251 via a drive shaft 23 and transmission 231, and a second transport roller pair 252 via a gear wheel carrying a toothed belt 24. The transport rollers of the first and second pairs 251 and 252 are designed in a width that assures dependable transport of the different film types. The transmission designed as a frictional gear 231 also connects to the transmission 36, via which the drive shaft 34 of the film spool is actuated. The copying operation can be performed through the projection opening 8 by the mini-lab (not shown). The solenoid 75 for actuating the film arresting device 7 is also arranged on the carrier plate. The stepping motor 22 is connected by means of a plug connector 221 to a control unit, not shown, of the mini-lab.

The foregoing description details the best mode known to the inventor of practicing the invention. Various variations will be readily apparent to those skilled in the art, accordingly the scope of the invention should be measured by the appended claims.

| PARTS LIST | |
|---|---|
| 100 | Film deck, general |
| 1001 | Film deck/carrier plates for APS films |
| BA | Processing station |
| 101 | First carrier plate for APS films |
| 102 | First carrier plate for 35 mm films |
| 1 | Developed film |
| 2 | Film guide of carrier plate |
| 3 | Means for film insertion |
| 31 | Film cartridge |
| 32 | Film cartridge receptacle |
| 321 | Film cartridge holder with drive and transmission block |
| 322 | Movable film cartridge holder |
| 323 | Sliding part |
| 33 | Shaft for opening and closing the film cartridge shutter |
| 34 | Shaft for driving the film spool |
| 35 | Button |
| 36 | Transmission block |
| 37 | Film guide |
| 4 | Passive (driven) drive roller pair |
| 41 | First drive roller pair |
| 42 | Second drive roller pair |
| 41 | Bearings of drive roller pairs |
| 5 | PCB sensor unit |

-continued

PARTS LIST

| | |
|---|---|
| 6 | MOF unit |
| 61/62 | Magnetic heads |
| 7 | Film arresting device |
| 71 | Projection opening |
| 72 | Arresting plate |
| 721 | Hinge |
| 722 | Holder |
| 73 | Anchor plate |
| 74 | Anchor pin |
| 75 | Solenoid |
| 76 | Hold-down |
| 77 | Film support surface |
| 8 | Projection opening |
| 11 | Holes |
| 1002 | Film deck/carrier plates for 35 mm films |
| 12 | Film insertion opening |
| 20 | Second carrier plate |
| 21 | Fixing pins |
| 22 | Stepping motor |
| 221 | Electrical plug connector |
| 23 | Drive shaft |
| 231 | Transmission |
| 24 | Toothed belt |
| 25 | Active (driving) drive roller pair |
| 251 | First active drive roller pair |
| 252 | Second active drive roller pair |
| 261 | Bearing element for first active drive roller pair |
| 262 | Bearing element for second active drive roller pair |
| 271 | Openings for receiving the first active drive roller pair |
| 272 | Openings for receiving the second active drive roller pair |
| 28 | Connecting means |

What is claimed is:

1. In a film deck for feeding and returning developed photographic films of various types from an insertion device to a processing station of a mini-lab, includes a first carrier plate with a film guidance mechanism and a film transport mechanism, a second carrier plate and means for connecting and detaching the first carrier plate to/from the second carrier plate, the improvement comprising:

a film-specific processing mechanism and a film insertion mechanism both mounted on the first carrier plate, wherein the film-specific processing mechanism being capable of spatial reorientation to accommodate various sized film types; and an active film drive mounted on the second carrier plate for a plurality of film types, the active film drive being operatively connected to the insertion device to convey various film types from the insertion device to the processing station.

2. The device according to claim 1 wherein the active film drive further comprises a stepping motor and a toothed belt connected thereto, the active film drive driving at least a pair of film transport rollers arranged on the second carrier plate.

3. The device according to claim 2 wherein the pairs of transport rollers further comprise a spatial arrangement at a distance from one another allowing various film types to be transportable to the processing station.

4. The device according to claim 1 wherein film-specific processing mechanism further comprises:

a sensor array for scanning of film perforation and film bar-code;

a magnetic head for scanning magnetic tracks provided on the film, and means for ensuring planar film support.

5. The device according to claim 1 wherein the film insertion mechanism includes a film cartridge receptacle comprising a stationary film cartridge holder having a drive and transmission block and a movable film cartridge holder.

* * * * *